United States Patent Office 2,721,156
Patented Oct. 18, 1955

2,721,156

METHOD OF TREATING ALUMINUM-COATED IRON ELECTRODES

Willi Ernst Steuck, Hamburg-Nienstedten, Germany, assignor to Hartford National Bank and Trust Company, Hartford, Conn., as trustee No Drawing. Application May 14, 1954,
Serial No. 429,970

Claims priority, application Germany June 29, 1953

3 Claims. (Cl. 148—13.1)

Improvements in or relating to a method of treating aluminum-coated iron electrodes.

There are known anodes for high thermal charges in electric discharge tubes, made of sheet iron coated with aluminum and subjected to an annealing process at about 500° to 1000° C. in order to improve the radiation properties. During the annealing process care must be taken that the said upper temperature limit is not exceeded to a considerable extent, since otherwise the radiation properties would be reduced again.

Such an annealing process produces a blue-grey colour of the blank aluminum layer owing to the production of a chemical compound of iron and aluminum.

The invention provides a means of obtaining black surfaces.

According to the invention in a method of manufacturing high-charged electrodes, more particularly anodes for use in electric discharge tubes, made of sheet iron coated with aluminum and subjected to an annealing process at about 500° C. to 1000° C. prior to their use, the electrode material is boiled in distilled water for a short time subsequent to annealing.

The measure according to the invention permits of obtaining electrode plates, the total radiation of which approximates closely that of black bodies. It is advisable to boil the electrode material subsequent to annealing for from half a minute to a few minutes in distilled water.

If the electrode material is then again subjected to an annealing process, an increased development of gas occurring after boiling, may be avoided during the evacuation.

It has been found that the effect obtained in accordance with the invention may even be increased, if the annealing process, the boiling process in distilled water and the subsequent annealing process are repeated several times.

What is claimed is:

1. A method of manufacturing an electrode for an electric discharge tube comprising providing an electrode constituted of sheet iron coated with aluminum, subjecting said electrode to an annealing process at about 500° to 1000° C., and thereafter boiling said electrode in distilled water for a short time.

2. A method as set forth in claim 1 wherein the boiling step is carried out for about half a minute to a few minutes.

3. A method as set forth in claim 1 wherein, subsequent to the boiling step, the electrode is subjected to a second annealing process at about 500° to 1000° C.

References Cited in the file of this patent

UNITED STATES PATENTS 2,109,387    Hanson et al. _____ Feb. 22, 1938